Dec. 16, 1952 D. L. TAPP 2,621,918
MEANS FOR RESTORING THE STIFFNESS TO WEAKENED
AUTOMOBILE KNEE ACTION COIL SPRINGS
Filed Oct. 25, 1950

INVENTOR.
DAMON L. TAPP
BY
ATTORNEY

Patented Dec. 16, 1952

2,621,918

UNITED STATES PATENT OFFICE 2,621,918

MEANS FOR RESTORING THE STIFFNESS TO WEAKENED AUTOMOBILE KNEE ACTION COIL SPRINGS

Damon Lambert Tapp, Plymouth, Ind.

Application October 25, 1950, Serial No. 192,071

3 Claims. (Cl. 267—20)

My invention relates to means for restoring the front wheel suspension mechanism of an automobile to normal operating condition, after it has become out of adjustment due to wear.

A primary object of the invention is to provide a highly simplified, inexpensive attachment for restoring the proper tension to the front wheel suspension coil springs of automobiles, after the wheel suspension mechanism has become worn.

A further object is to provide an attachment of the above-mentioned character, the use of which will restore the front end of the automobile to its normal height, automatically assure proper camber adjustment and thus prevent hard steering and excessive tire wear due to improper wheel alignment, save the expensive replacement of the coil springs and restore the wheel suspension mechanism to its normal state so that it may function as when new.

A further object is to provide a choke collar for the coil springs which checks the downward stroke of the spring but does not hinder its expanding action, the choke collar affording a bearing surface about the entire circumference of the spring.

Other objects and advantages of the invention will be apparent during the course of the following description.

Figure 1:
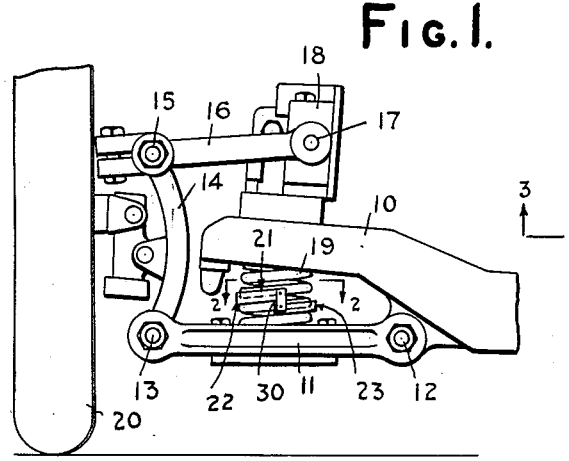
Figure 2:
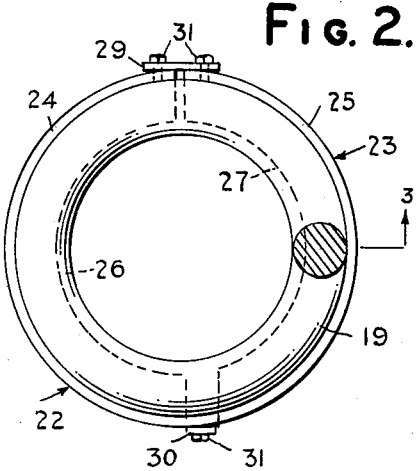
Figure 3:
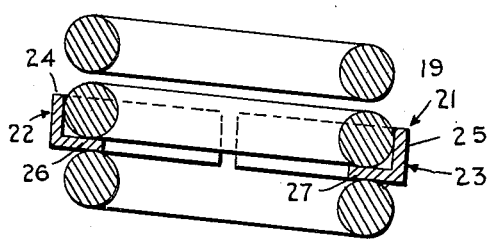
Figure 4:
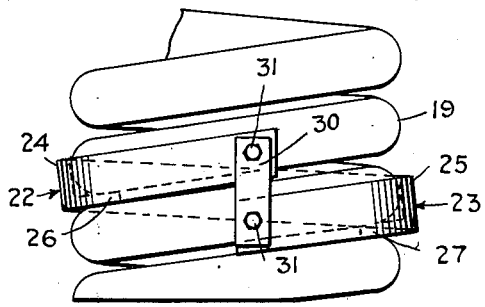
Figure 6:
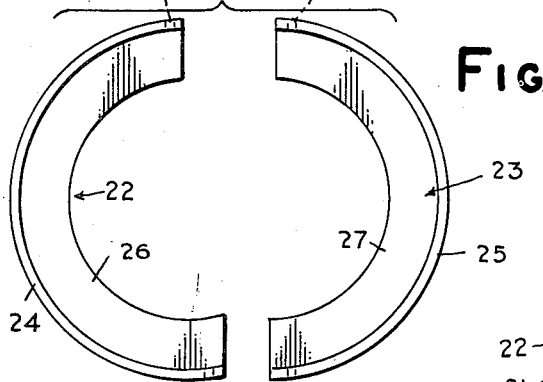
Figure 5:
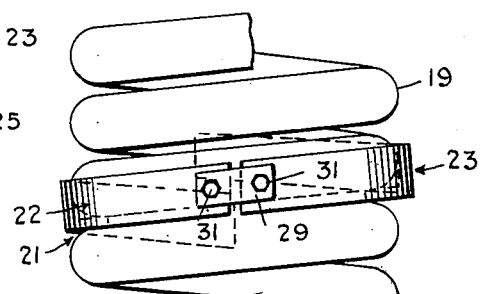
Figure 7:
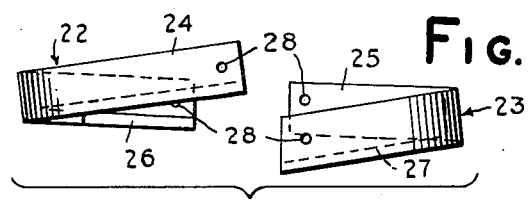

In the accompanying drawings, forming a part of this application, and in which like numerals are employed to designate like parts throughout same, Figure 1 is a fragmentary front elevation of an automobile front wheel suspension mechanism equipped with the means embodying my invention, Figure 2 is an enlarged horizontal section taken on line 2—2 of Figure 1, parts omitted, Figure 3 is a central vertical section taken on line 3—3 of Figure 2, Figure 4 is an enlarged fragmentary side elevation of a coil spring having my attachment applied thereto, Figure 5 is a similar view taken from the opposite side of the coil spring, Figure 6 is a composite plan view of the attachment removed, and, Figure 7 is a composite side elevation of the attachment shown in Figure 6.

In the drawings, where for the purpose of illustration is shown a preferred embodiment of my invention, the numeral 10 designates a main automobile front wheel suspension cross arm, forming a part of the chassis main frame and extending transversely of the chassis. A lower knee action arm 11 is hingedly connected at 12 to the cross arm 10, and is adapted to swing vertically. The outer end of the arm 11 is hingedly connected at 13 to a generally vertical steering knuckle support link 14, the upper end of which is hingedly connected at 15 to an upper knee action arm 16. The upper arm 16 is adapted to swing vertically, and has its inner end hingedly connected at 17 to a shock absorber mechanism 18, in turn rigidly mounted upon the cross arm 10. A compressible coil spring 19 has its lower end seated upon the lower knee action arm 11, and its upper end engages the cross arm 10, as shown. When the adjacent wheel 20 strikes a bump in the road, the lower knee action arm 11 swings upwardly, and the coil spring 19 is compressed between it and the fixed cross arm 10. The parts thus far described constitute a conventional front wheel suspension or knee action mechanism.

When the automobile has been driven for some time, the coil spring 19 loses part of its tension. This causes the front end of the automobile to move closer to the ground and gives the appearance of sagging. Also, the front wheel alignment and camber is disturbed, and this causes difficult steering and excessive tire wear. One way to remedy this condition is to replace the worn coil spring 19 on both sides of the automobile, but this is quite costly.

In order to remedy the condition with the minimum expense and labor, I provide a simple coil spring attachment or choke collar 21, which may be readily applied to the worn coil spring without disturbing the remainder of the suspension mechanism, and which will not hinder the normal action of the spring.

The choke collar 21 comprises a pair of separate collar sections or spacers 22 and 23, preferably formed of malleable cast iron or the like. The collar section 23 is preferably semi-circular, Figure 6, and the other collar section 22 is likewise circularly curved, but extends about an arc of slightly more than 180 degrees, for a purpose to be described. The collar sections 22 and 23 include upstanding circumferentially extending marginal flanges 24 and 25, and lower continuous circumferentially extending spacing webs or plates 26 and 27, integral with the flanges 24 and 25. The collar sections 22 and 23 are thus L-shaped in radial cross section, Figure 3, and the radial width of the webs 26 and 27 is preferably slightly less than the diameter of the wire forming the spring 19, Figure 3. Likewise, the height of the flanges 24 and 25 is slightly less than the diameter of the wire forming the spring 19.

The circularly curved collar sections 22 and 23 are also spirally formed or twisted slightly, to conform to the spiral formation of the coil spring 19, as best shown in Figure 7.

The collar sections 22 are applied to the spring 19 from opposite sides of the spring, and the lower radially inwardly extending webs 26 and 27 engage between adjacent coils of the spring and form spacers therebetween, as shown. The upstanding flanges 24 and 25 engage the periphery of the spring coils and serve as stops to prevent the collar sections from shifting too far radially inwardly. When the flanges 24 and 25 are thus brought into engagement with the periphery of the spring, the collar sections 22 and 23 form a substantially continuous circular collar 21 extending about the entire circumference of the spring. One pair of adjacent ends of the collar sections 22 are now disposed at the same elevation and in substantial abutting relation, Figure 5. The other pair of adjacent ends of the collar sections are now arranged in vertically spaced superposed or overlapping relation, Figure 4, due to the spiral twist of the collar sections 22 and 23 and due to the fact that the collar section 22 extends about an arc greater than 180 degrees.

The overlapping ends of the collar sections are spaced apart vertically a distance equal to the pitch, or spacing, between an adjacent pair of the spring coils. The circumferential webs 24 and 25 are provided near their ends and above the webs 26 and 27 with radial screw-threaded openings 28. Attaching plates or elements 29 and 30 are provided for connecting corresponding ends of the collar sections 22 and 23. The attaching plate 29 is arranged upon the outer side of the flanges 24 and 25, and is substantially horizontally disposed, as shown. The plate 29 bridges the gap between the abutting ends of the collar sections, that is the ends which are at the same elevation. The plate 29 is provided near its ends with openings which register with the adjacent pair of screw-threaded openings 28, and screws 31 engage in these registering openings and serve to detachably rigidly secure the abutting ends of the collar sections together.

The screw-threaded openings 28 near the overlapping ends of the collar sections 22 and 23 are arranged in vertical alignment, and the attaching plate 30 is vertically disposed upon the outer faces of the flanges 24 and 25, and bridges the gap between the overlapping ends of the collar sections, Figure 4. The plate 30 has openings which register with the screw-threaded openings 28, and additional screws 31 serve to detachably rigidly connect the overlapping ends of the collar sections.

It is thus seen that the assembled collar sections 22 and 23 make up the substantially continuous choke collar or spacer 21, previously mentioned. The webs 26 and 27 constitute a substantially continuous circumferential spacer between the adjacent pair of spring coils to which the attachment is applied. The upstanding marginal flanges 24 and 25 in no way interfere with the normal action of the coil spring 19 when the same expands, and the webs 26 and 27 merely prevent the adjacent pair of spring coils from moving together when the coil spring is compressed. This has the effect of stiffening the coil spring 19 which has become weakened due to wear, since the pair of spring coils are choked or rendered inactive on the compression stroke of the spring. The webs 26 and 27 afford a bearing surface about the entire circumference of the spring, so that there is no tendency for the spring to twist or buckle during its flexing. The choke collar is extremely easy to apply and remove, and it is rugged and durable in construction. It in no way hinders the normal action of the remainder of the wheel suspension mechanism.

It is to be understood that the form of the invention herewith shown and described is to be taken as a preferred example of the same, and that various changes in shape, size and arrangement of parts may be resorted to, without departing from the spirit of the invention or the scope of the subjoined claims.

Having thus described my invention, I claim:

1. The combination with an automobile knee action spiral coil spring, of a pair of arcuate spacer sections, each spacer section being spirally formed to follow the spiral curvature of the spring, each spacer section being substantially L-shaped in cross section to form a radial flange engageable between selected coils of the spring and a marginal flange engageable with the periphery of the spring to prevent inward radial movement of the spacer section, the spacer sections being applied to the spring in opposed relation and substantially entirely surrounding the spring and forming for said selected coils a substantially continuous circumferential spacer, and means detachably connecting together the adjacent end portions of the spacer sections.

2. A wear compensating device for use with a spiral coil spring comprising a pair of arcuate spacer sections, each spacer section being spirally twisted to follow the spiral curvature of the spring, each spacer section being substantially L-shaped in cross section to form a radial flange engagable between selected coils of the spring and a marginal axial flange engagable with the periphery of the spring to prevent inward radial movement of the spacer section, the spacer sections being applied to the spring in diametrically opposed relation and extending circumferentially substantially entirely about the spring and forming for said selected coils a substantially continuous circumferential spacer, and detachable connecting means for the corresponding ends of the spacer sections.

3. A wear compensating device for use with a spiral coil spring of an automobile front wheel suspension mechanism comprising companion arcuate spacer sections, each spacer section being substantially semi-circular and spirally formed to follow the spiral curvature of the spring, each spacer section being substantially L-shaped in cross section to form a radial circumferential flange engagable between selected coils of the spring and an outer axial circumferential flange engagable with the periphery of the spring to prevent displacement of the device when it is applied to the spring, the spacer sections being arranged upon the spring in diametrically opposed relation and extending about substantially the entire circumference of the spring for forming a substantially continuous circumferential spacer for said selected coils, one pair of corresponding ends of the spacer sections being disposed in substantial abutting relation, the other pair of corresponding ends of the spacer sections overlapping circumferentially, and separate attaching elements detachably connecting the pairs of corresponding ends of the spacer sections.

DAMON LAMBERT TAPP.

REFERENCES CITED

The following references are of record in the file of this patent:

UNITED STATES PATENTS

| Number | Name | Date |
| --- | --- | --- |
| 1,492,337 | Reid | Apr. 29, 1924 |
| 1,905,498 | Pfeiffer | Apr. 25, 1933 |
| 2,230,340 | Schreffler | Feb. 4, 1941 |